(12) United States Patent
Koster et al.

(10) Patent No.: US 11,010,203 B2
(45) Date of Patent: *May 18, 2021

(54) FUSING AND UNFUSING OPERATORS DURING A JOB OVERLAY

(71) Applicant: International Business Machines Corporation, Armonk, NY (US)

(72) Inventors: David M. Koster, Rochester, MN (US); Jason A. Nikolai, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,105

(22) Filed: Jun. 20, 2019

(65) Prior Publication Data

US 2019/0317823 A1 Oct. 17, 2019

Related U.S. Application Data

(63) Continuation of application No. 15/953,820, filed on Apr. 16, 2018.

(51) Int. Cl.
  *G06F 9/46* (2006.01)
  *G06F 9/50* (2006.01)
  *G06F 8/656* (2018.01)

(52) U.S. Cl.
  CPC .............. *G06F 9/5066* (2013.01); *G06F 8/656* (2018.02)

(58) Field of Classification Search
  CPC ........................................................ G06F 9/52

(Continued)

(56) References Cited

U.S. PATENT DOCUMENTS 6,182,058 B1 * 1/2001 Kohavi ................ G06K 9/6282
  706/20
7,826,365 B2 * 11/2010 Tang ....................... H04L 47/70
  370/235

(Continued)

OTHER PUBLICATIONS

Miller, B. et al.; "Graph-Based Approaches to Placement of Processing Element Networks on FPGAs for Physical Model Simulation"; ACM Transactions on Reconfigurable Technology an Systems, vol. 7, No. 4, Article 10; Dec. 2014.

(Continued)

*Primary Examiner* — Mehran Kamran
(74) *Attorney, Agent, or Firm* — Steven Bouknight; Edell, Shapiro & Finnan, LLC (57) ABSTRACT

A computer system configures processing elements within a distributed computing system. A processing element within a distributed computing environment is determined to be affected by a software update, wherein each processing element of the distributed computing system includes a plurality of components and the software update modifies the components of the processing elements. The determined processing element is split into a plurality of processing elements based on a set of factors. The plurality of components of the processing element are assigned among the plurality of processing elements based on components affected by the software update. Embodiments of the present invention further include a method and program product for configuring processing elements within a distributed computing system in substantially the same manner described above.

10 Claims, 5 Drawing Sheets

(58) Field of Classification Search
USPC .......................................................... 718/104
See application file for complete search history.

(56) References Cited

U.S. PATENT DOCUMENTS

| | | | | |
|---|---|---|---|---|
| 8,407,689 B2* | 3/2013 | Dournov | ............. | G06F 9/45533 717/172 |
| 8,583,686 B2* | 11/2013 | McGregor | ............. | G06N 5/022 707/776 |
| 9,146,775 B2* | 9/2015 | Branson | .................... | G06F 9/48 |
| 9,756,099 B2* | 9/2017 | Branson | ................ | H04L 67/322 |
| 2010/0325621 A1* | 12/2010 | Andrade | ................ | G06F 8/433 717/156 |
| 2012/0179809 A1* | 7/2012 | Barsness | ................ | H04L 29/06 709/224 |
| 2013/0198318 A1* | 8/2013 | Branson | ................ | G06F 9/44 709/217 |
| 2013/0198371 A1* | 8/2013 | Branson | ................ | H04L 43/08 709/224 |
| 2014/0136724 A1* | 5/2014 | Branson | ................ | H04L 67/322 709/231 |
| 2014/0236920 A1* | 8/2014 | Branson | ............. | G06F 16/2453 707/713 |
| 2015/0207702 A1* | 7/2015 | Branson | ................ | H04L 47/125 709/224 |
| 2015/0334148 A1* | 11/2015 | Branson | ............. | H04L 65/4069 709/219 |
| 2016/0110228 A1* | 4/2016 | Zhang | .................... | H04L 29/08 718/104 |
| 2016/0248688 A1* | 8/2016 | Barsness | ........... | G06F 16/24568 |
| 2016/0378566 A1* | 12/2016 | Barsness | ............... | G06F 9/5083 718/105 |
| 2017/0031722 A1* | 2/2017 | Barsness | ............... | G06F 3/0482 |
| 2017/0033979 A1* | 2/2017 | Cradick | .................. | H04L 43/08 |
| 2017/0060538 A1* | 3/2017 | Barsness | ........... | G06F 16/24568 |
| 2017/0155594 A1* | 6/2017 | Cook | .................... | G06F 9/4868 |
| 2017/0168748 A1* | 6/2017 | Barsness | ........... | G06F 16/24568 |
| 2017/0223075 A1* | 8/2017 | Hong | ........................ | G06F 8/65 |
| 2017/0344382 A1* | 11/2017 | Foster | .................... | H04L 69/40 |
| 2017/0344600 A1* | 11/2017 | Eidem | ............... | G06F 16/24568 |
| 2018/0018149 A1* | 1/2018 | Cook | ........................ | G06F 8/70 |
| 2019/0087480 A1* | 3/2019 | Palanciuc | ............ | G06F 16/285 |
| 2019/0205487 A1* | 7/2019 | Tamiya | .................. | G06F 17/50 |
| 2019/0220271 A1* | 7/2019 | Olderdissen | ........... | G06F 8/656 |
| 2019/0317822 A1 | 10/2019 | Koster et al. | | |

OTHER PUBLICATIONS

Wickham, H.; "The Split-Apply-Combine Strategy for Data Analysis; Journal of Statistical Software"; vol. 40, Issue 1; Apr. 2011.

Anonymously; "Method and apparatus for seamless GPU enablement on Stream Computing Platform"; http://ip.com/IPCOM/000245119D; Feb. 10, 2016.

Anonymously; "A Method and System for Computing a Single Thread Performance in a Simultaneous Multithreading Environment"; http://ip.com/IPCOM/000237737D; Jul. 8, 2014.

List of IBM Patents or Patent Applications Treated as Related, filed Jun. 20, 2019.

* cited by examiner

FUSING AND UNFUSING OPERATORS DURING A JOB OVERLAY

BACKGROUND

1. Technical Field

Present invention embodiments relate to performing a job overlay in a distributed computing environment, and more specifically, to fusing and unfusing operators during a job overlay.

2. Discussion of the Related Art

Stream computing typically refers to a computing environment in which a sequence of data processing elements are coupled together to process streaming data in real-time. Each processing element of a computing stream receives input in the form of data tuples, operates on the data in some manner, and outputs processed data to the next processing element. During a software update, processing elements may be added, modified, or removed from a computing stream. Given the distributed nature of a computing stream application, it may be difficult to perform a software update during runtime without negatively impacting the functionality of the stream computing environment.

SUMMARY

According to one embodiment of the present invention, a computer system configures processing elements within a distributed computing system. A processing element within a distributed computing environment is determined to be affected by a software update, wherein each processing element of the distributed computing system includes a plurality of components and the software update modifies the components of the processing elements. The determined processing element is split into a plurality of processing elements based on a set of factors. The plurality of components of the processing element are assigned among the plurality of processing elements based on components affected by the software update. Embodiments of the present invention further include a method and program product for configuring processing elements within a distributed computing system in substantially the same manner described above.

BRIEF DESCRIPTION OF THE DRAWINGS

Generally, like reference numerals in the various figures are utilized to designate like components.

DETAILED DESCRIPTION

Present invention embodiments relate to performing a job overlay in a distributed computing environment, and more specifically, to fusing and unfusing operators during a job overlay. With respect to a stream computing environment, a stream computing application, or job, refers to a compiled application that comprises a collection of operators executed by one or more processes referred to as processing elements. A job typically receives input data in the form of tuples, passes the data through a sequence of operators that each perform some operation on the data, and outputs processed data.

A job update may include partial code changes to a current or previous job. A job may be updated at runtime by performing a job overlay, in which some portions of a job continue running while other portions are updated. During a runtime job overlay, an operator may be unfused (i.e., removed) from its processing element, and fused (i.e., added) to another processing element. Both operators and processing elements may be modified during a job overlay. When a processing element is modified by a job overlay, the processing element may require a restart, whereas processing elements that are not changed may not require a restart. Furthermore, when a job is modified by a job overlay, the processing element hosting the job may require a restart.

A job overlay may only update a subset of an application's processing elements; similarly, a job overlay may affect some, but not all, of the operators in a particular processing element. For example, a job overlay may change three of four operators of a processing element. Rather than include the unaffected operator in the restart of the processing element, the unaffected operator may be unfused from the processing element and fused to another processing element that will not restart due to the job overlay. Present invention embodiments reduce the impact of a runtime job overlay by intelligently fusing and unfusing operators. Thus, a distributed stream or other computing application is able to be updated without temporarily suspending execution of non-updated jobs, which improves the functioning of the distributed system by avoiding unnecessary downtime and by reducing bottlenecks (such as queueing of tuples at an input stage).

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
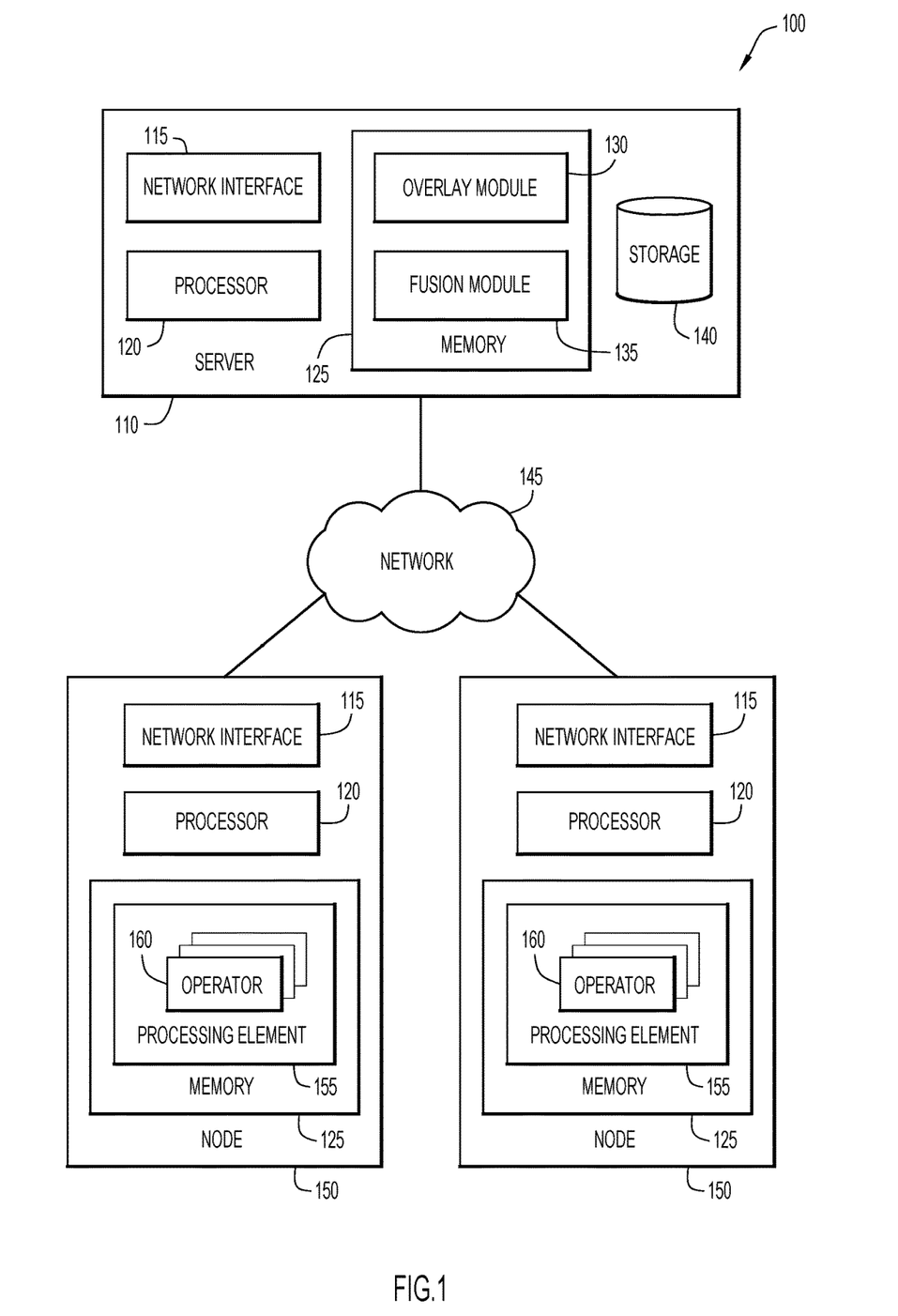
FIG. 1 is a block diagram depicting a computing environment for performing a job overlay in accordance with an embodiment of the present invention.

Present invention embodiments will now be described in detail with reference to the Figures. FIG. 1 is a block diagram depicting a computing environment 100 for performing a job overlay in accordance with an embodiment of the present invention. As depicted, computing environment 100 includes a server 110, network 145, and nodes 150. It is to be understood that the functional division among components of computing environment 100 have been chosen for purposes of explaining the present invention and is not to be construed as a limiting example.

Nodes 150 are computer systems that together host a distributed computing job, such as a stream computing job. Each node 150 includes a network interface 115, processor 120, and memory 125 with processing element 155 and operator 160. In various embodiments of the present invention, a node 150 may include a laptop computer, a tablet computer, a netbook computer, a personal computer (PC), a desktop computer, a personal digital assistant (PDA), a smart phone, a thin client, or any programmable electronic device capable of executing computer readable program instructions. Nodes 150 may include internal and external hardware components, as depicted and described in further detail with respect to FIG. 4.

Each node 150 may include one or more processing elements 155 that may each, in turn, contain one or more operators 160. Thus, computing environment 100 may include several nodes 150, processing elements 155, and operators 160 upon which a job may be distributed. The number of nodes 150, processing elements 155, and operators 160 may depend on several factors, such as the computing requirements of a given job. In some embodiments, each processing element 155 is a Linux process and each operator is an IBM Streams operator. An operator 160 may receive a stream of tuples as input, perform some action on the stream (e.g., filtering, aggregation, analytics, etc.), and output the resulting stream to the next operator 160.

Server 110 may include network interface 115, processor 120, memory 125 with overlay module 130 and fusion module 135, and storage 140. In general, server 110 may manage distributed stream computing applications with overlay module 130 and fusion module 135, which are stored in memory 125. In various embodiments of the present invention, server 110 may include a laptop computer, a tablet computer, a netbook computer, a personal computer (PC), a desktop computer, a personal digital assistant (PDA), a smart phone, a thin client, or any programmable electronic device capable of executing computer readable program instructions. Server 110 may include internal and external hardware components, as depicted and described in further detail with respect to FIG. 4.

Overlay module 130 may update a job by performing a job overlay, which writes over or replaces portions of a job's code; a job may be updated on an operator-by-operator basis. When an update to a job is submitted, overlay module 130 may determine which processing elements 155 and operators 160 will be changed when the job overlay is applied. In some embodiments, overlay module 130 determines the processing elements and operators that are affected by the job overlay by comparing the updated application to the current application to find differences. For example, overlay module 130 may apply a hash function to the compiled executables corresponding to the submitted application and the current application, and then compare the generated hashes. Alternatively, in some embodiments, a listing of processing elements and operators that are modified by the software update is submitted along with the submission of the updated application.

Once overlay module 130 has determined which processing elements and operators are affected by the job overlay, overlay module 130 may select operators that can continue running during the job overlay if they are fused into a different processing element. For example, overlay module 130 may identify that a particular operator is not modified by the overlay, but will nevertheless be restarted due to a restart of the processing element to which the operator belongs. Overlay module 130 may then direct fusion module 135 to unfuse the identified operator from its processing element and fuse it into another processing element. Overlay module 130 may intelligently determine which operators should be fused into which processing elements according to a variety of factors, which will be described in further detail with respect to FIGS. 2 and 3A-3B.

Fusion module 135 may fuse and unfuse operators from processing elements while a job is executing (i.e. at runtime). In some embodiments, fusion module 135 may fuse and unfuse operators before or during a job overlay as instructed by overlay module 130. Fusion module 135 may unfuse an operator from a first processing element and fuse the operator into a second processing element by terminating the operator's execution in the first processing element and beginning execution of the operator in the second processing element. When an operator is fused to a new processing element 155, fusion module 135 may redirect its input and output streams accordingly. Fusion module 135 may also launch a new processing element and then fuse an operator to the new processing element.

Storage 140 may include any non-volatile storage media known in the art. For example, storage 140 can be implemented with a tape library, optical library, one or more independent hard disk drives, or multiple hard disk drives in a redundant array of independent disks (RAID). Similarly, data on storage 140 may conform to any suitable storage architecture known in the art, such as a file, a relational database, an object-oriented database, and/or one or more tables. Storage 140 may store program instructions for one or more jobs, including instructions for how to perform a job overlay on a previous or current job, as well as metadata corresponding to the job.

Network 145 may include, for example, a local area network (LAN), a wide area network (WAN) such as the Internet, or a combination of the two, and may include wired, wireless, or fiber optic connections. In general, network 145 can be any combination of connections and protocols that will support communications between server 110 and nodes 150 (via their respective network interfaces 115) in accordance with an embodiment of the present invention.

Figure 2:
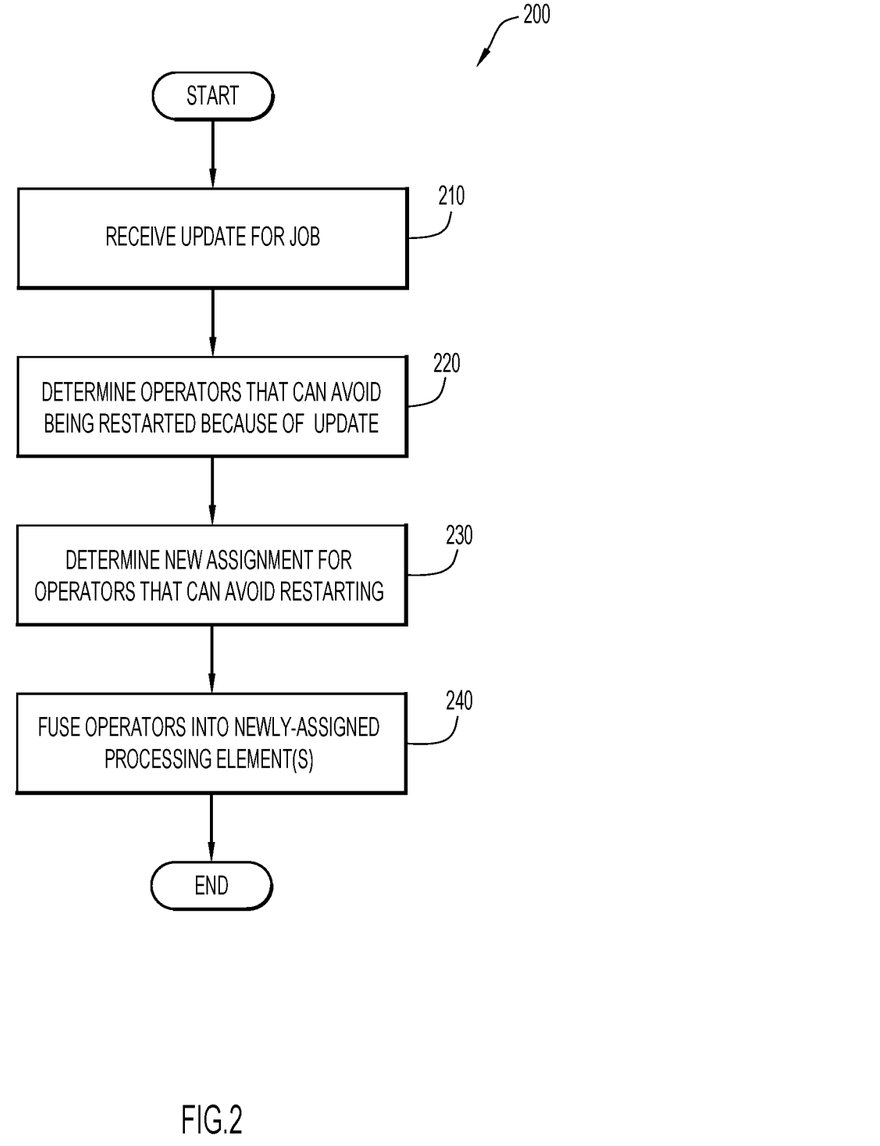
FIG. 2 is a flow chart depicting a method of overlaying a job in accordance with an embodiment of the present invention.

FIG. 2 is a flow chart depicting a method 200 of overlaying a job in accordance with an embodiment of the present invention.

An update for a job is received by server 110 at operation 210. In some embodiments, the update is uploaded to storage 140 of server 110. The update may make modifications to a current job of computing environment 100. Modifications that are introduced by a job update may be determined by comparing the updated job to the current job, or the modifications may be explicitly listed and included along with the job update. In some embodiments, a job (e.g., a current job or an update to a current job) is an IBM Streams application coded in a Streams Processing Language (SPL), a distributed data flow composition language.

The operators that can avoid being restarted by the update are determined at operation 220. Upon receiving an update for a job, overlay module 130 may determine how to overlay the updated job over a current job. Overlay module 130 may first determine which operators are not being updated, but will nevertheless be restarted because of the job overlay. For example, overlay module 130 may select operators that are not updated during the overlay, but are hosted by a processing element that will restart due to the overlay.

New processing element assignments for the operators that can avoid restarting are determined at operation 230. Overlay module 130 may intelligently select processing elements that are not restarting due to the job overlay, and assign operators to be fused to those processing elements. Overlay module may also launch one or more new processing elements to which operators 160 may be assigned. In some embodiments, the job update may include instructions detailing how to fuse and unfuse operators during the job overlay.

New processing element assignments for operators that can avoid restarting may be determined according to several factors, which may be considered by overlay module 130 independently or in some combination. When overlay module considers a combination of factors, the factors may be weighted in some manner in order to increase the influence that some factors have over other factors when combined. Furthermore, the weight of the factors may be adjusted based on the impact of fusing and unfusing operators during a current or previous job overlay. One such factor may include user-specified parameters that indicates how to split the operators of processing elements into other processing elements. For example, a user may provide instructions for how all or some of the operators should be fused.

Overlay module 130 may determine operator assignments according to whether any entities are accessing metrics associated with a given processing element. A user or an application may be monitoring metrics associated with a processing element that could change if operators are fused into that processing element. Fusing an operator into a processing element could affect the reliability of entities that depend on the metrics associated with the processing element as input. For example, in an IBM Streams environment, a "view" refers to a user interface that shows a sampling of data taken from an operator or processing element for display in a user console or spreadsheet. Overlay module 130 may determine that a particular processing element is not a candidate for operator assignment because a view has been created for the processing element (or for an operator of the processing element), and that fusing an operator into the processing element would render the metrics reported in the view inaccurate or obsolete. In another embodiment, overlay module 130 may determine that a processing element is not a candidate for operator assignment because either the processing element or an operator hosted by the processing element is being monitored via a representational state transfer application programming interface (RESTful API).

Overlay module 130 may determine operator assignments according to the performance implications of fusing or unfusing operators with other processing elements. For example, if a node has one processing element, and the processing element is consuming less than 50% of the node's available processing capacity, overlay module 130 may assign one or more operators to be fused with that processing element; however, if fusing an operator with the processing element would cause the processing element to consume too much (e.g., more than a threshold percentage) of the node's processing capacity, overlay module 130 may not assign the operator to that processing element.

Overlay module 130 may take into account an operator's historical resource consumption when assigning the operator to a processing element. For example, fusing an operator to a processing element may not result in an immediate violation of a node's resource capacity, but the operator may have a history of occasional albeit extreme resource utilization increases that would result in a violation of the node's resource capacity, then overlay module 130 may not assign the operator to the processing element. Furthermore, if there is a scheduled or predicted increase in resource utilization of a particular operator, overlay module 130 may assign the operator to a processing element that can accommodate the operator's scheduled or predicted future resource utilization. Another factor that is weighed when assigning operators to processing elements is whether a processing element is known to fail. For example, if a processing element is hosted by a node that regularly experiences downtime, then overlay module 130 may assign an operator to a more stable processing element over the processing element that is known to fail.

Overlay module 130 may determine operator assignments according to whether fusing an operator into a processing element would increase or cause congestion at a processing element. For example, overlay module 130 may not fuse an operator into a processing element that belongs to a low performance area of the streaming environment. Congestion may be measured according to a processing element's back pressure (i.e. the number of tuples queued at the input of the processing element). Back pressure may increase when a processing element's input tuple flow rate exceeds its output tuple flow rate. If overlay module 130 determines that fusing an operator to a processing element would cause the processing element's back pressure to begin to increase, or to exceed a threshold queue length, then overlay module 130 may not assign the operator to that processing element, and instead select a processing element assignment that will not cause congestion.

Overlay module 130 may prioritize the assignment of some operators over other operators. For example, if there are three operators that can avoid being restarted by being fused to other processing elements, but there is only enough capacity to accommodate fusing two of the three operators (meaning that one of the operators will have to restart), then overlay module 130 may prioritize assigning operators that take longer to restart over operators that restart quickly. Overlay module 130 may prioritize assigning an operator that maintains state (and thus takes long to restart) over an operator that does not maintain state.

Another factor that may be considered when assigning operators to processing elements is a resource cost metric. A resource cost metric may refer to monetary costs incurred due to hosting a processing element. For example, a node may be hosted by a server that bills customers based on resource consumption of the hosted content. Overlay module 130 may prioritize assigning an operator to a processing element that is hosted by a cheaper provider. A resource cost metric may also be measured according to the degree to which a processing element competes with other processes on a host. For example, if fusing an operator to a particular processing element would result in that processing element consuming host resources at the expense of other hosted processes, then overlay module 130 may not assign an operator to that processing element.

Operators are fused into assigned processing elements at operation 240. Fusion module 135 may unfuse an operator from its current processing element and fuse the operator into its newly-assigned processing element by terminating the operator's execution in the first processing element and beginning execution of the operator in the second processing element. When an operator is fused to a new processing element 155, fusion module 135 may redirect its input and output streams accordingly. If an operator is assigned to a processing element that has not started running, fusion module 135 may launch a new processing element and then fuse an operator to the new processing element.

Figure 3A:
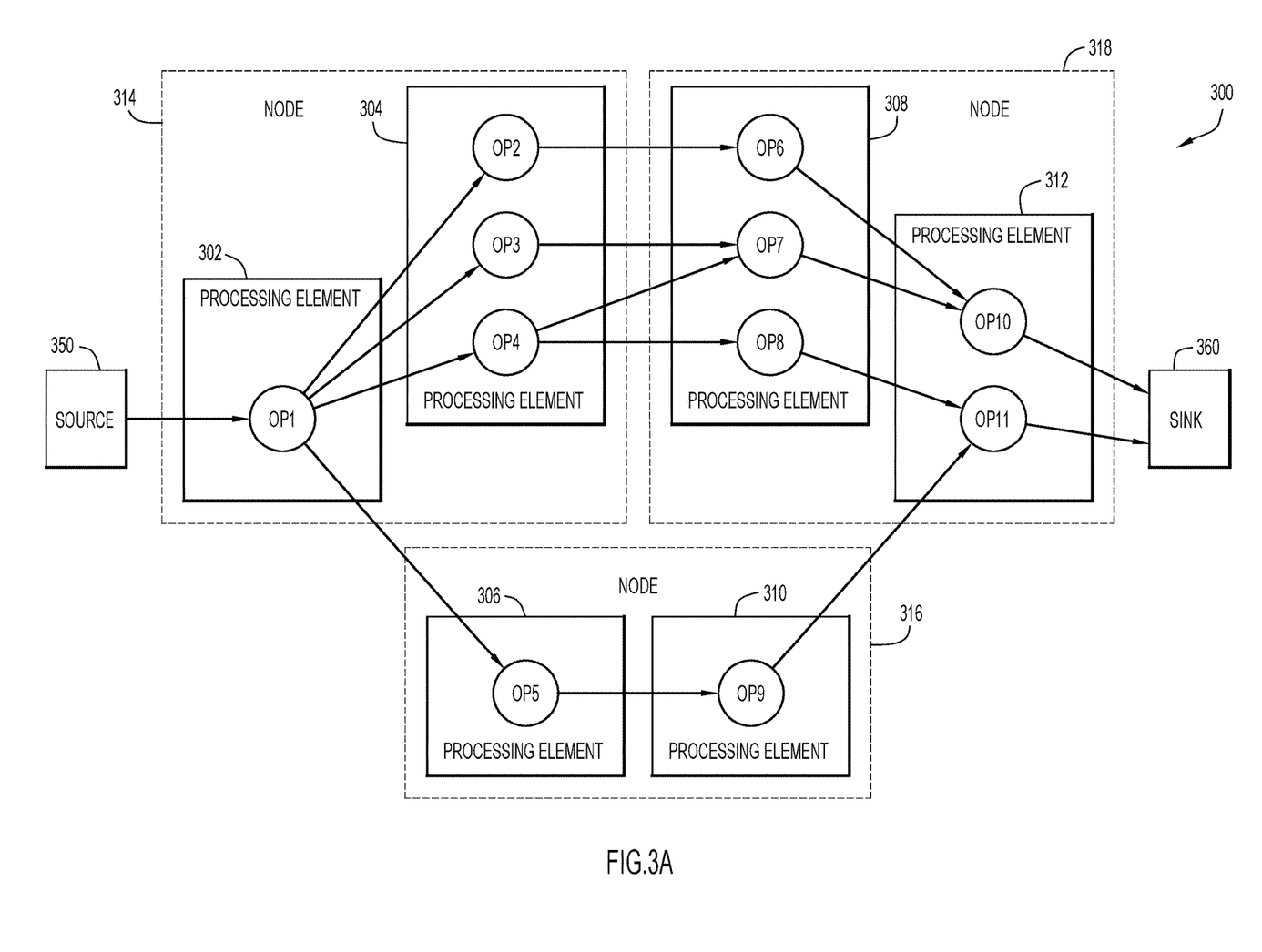
FIG. 3A illustrates an example of an operator graph of a job before a job overlay in accordance with an embodiment of the present invention.

FIG. 3A illustrates an example of an operator graph 300 of a job before a job overlay in accordance with an embodiment of the present invention. As depicted, operator graph 300 includes a source 350, nodes 314, 316, and 318, processing elements 302, 304, 306, 308, 310, and 312, and operators OP1-OP11, and sink 360. Generally, a stream of data flows from source 350 and is passed from operator to operator, which each perform some action on the stream, until the stream is output to sink 360.

Node 314 hosts processing elements 302 and 304, node 316 hosts processing elements 306 and 310, and node 318 hosts processing elements 308 and 312. Processing element 302 has a single operator, OP1; similarly, processing element 306 hosts operator OP5 and processing element 310 hosts operator OP9. Processing element 304 hosts operators OP2, OP3, and OP4, and processing element 308 hosts operators OP6, OP7, and OP8. Processing element 312 hosts two operators, OP10 and OP11. Arrows indicate the flow of the stream from operator to operator as the stream splits and merges.

Figure 3B:
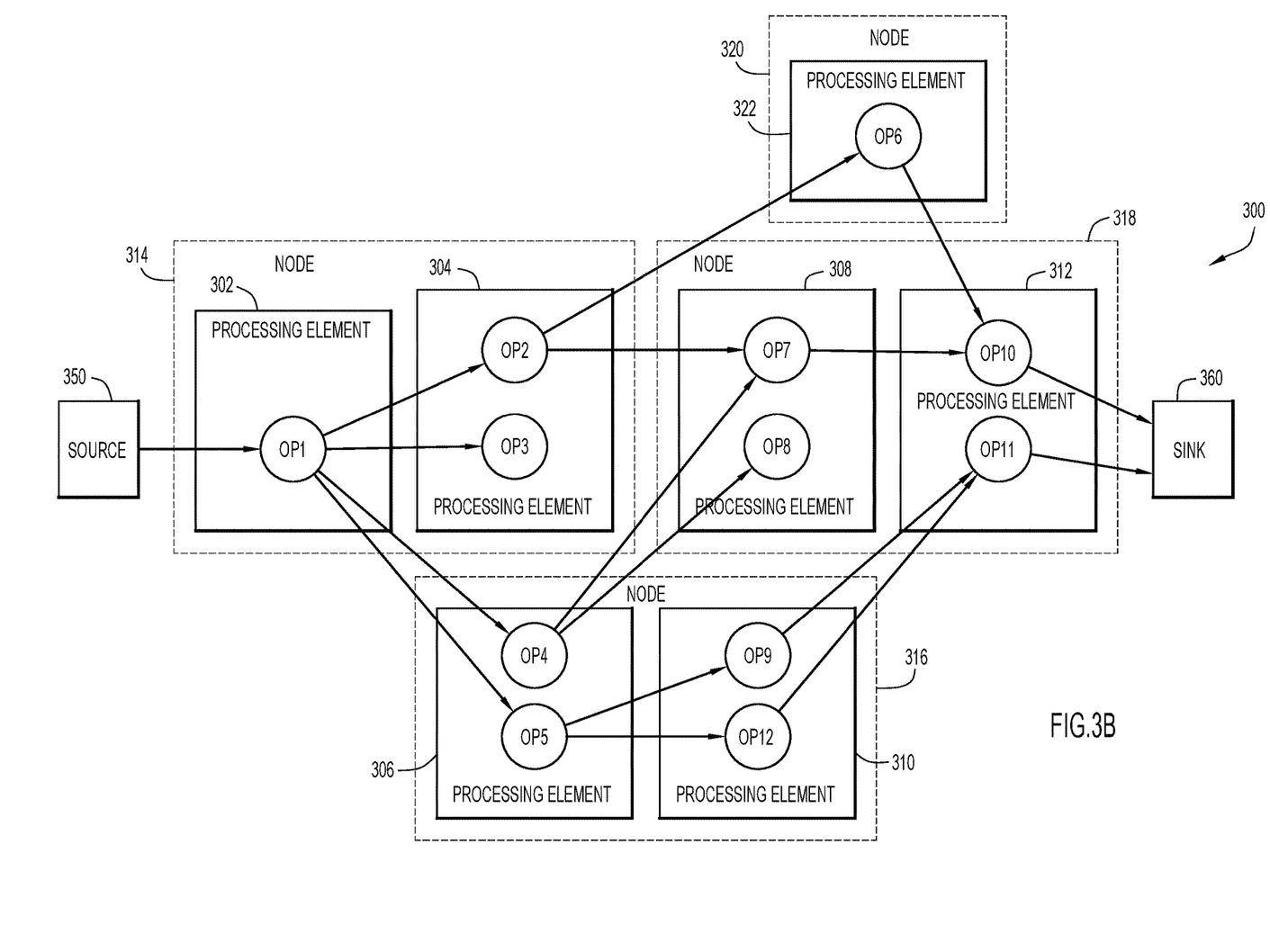
FIG. 3B illustrates an example of an operator graph of a job during or after a job overlay in accordance with an embodiment of the present invention.

FIG. 3B illustrates an example of an operator graph 300 of a job during or after a job overlay in accordance with an embodiment of the present invention. The job overlay has added another operator, OP12, to the computing environment, and has affected operators OP4 and OP6. As depicted, operator graph 300 includes a source 350, nodes 314, 316, and 318, processing elements 302, 304, 306, 308, 310, and 312, and operators OP1-OP11, and sink 360. In contrast to FIG. 3A, FIG. 3B additionally includes node 320, processing element 322, and operator OP12.

During the job overlay, some of the operators have been unfused from their original processing elements and fused to another processing element. In this example, operator OP4 has been unfused from processing element 304 and fused into processing element 306. Overlay module 130 may have determined that processing element 304 will be restarted during the job overlay, and that operator OP4 can avoid being restarted if it is fused with another processing element. Overlay module 130 may determine that node 316 has enough available resources to assume the workload of operator OP4.

Operators may also be added or removed during a job overlay. For example, operator OP12 may be added to processing element 310 during a job overlay. Overlay module 130 may select processing element 310 to host operator OP12 because node 316 has the available computing resources to assume the workload of operator OP12.

A job overlay may also add nodes and processing elements to a job. During the job overlay, overlay module 130 may determine that operator OP6 can avoid restarting if it is unfused from processing element 308. If none of the nodes in the job have the available computing resources to host operator OP6, then a new node may be added. For example, fusion module 135 may add node 320 and launch processing element 322 to host operator OP6, which is then unfused from processing element 308 and fused into processing element 322.

Figure 4:
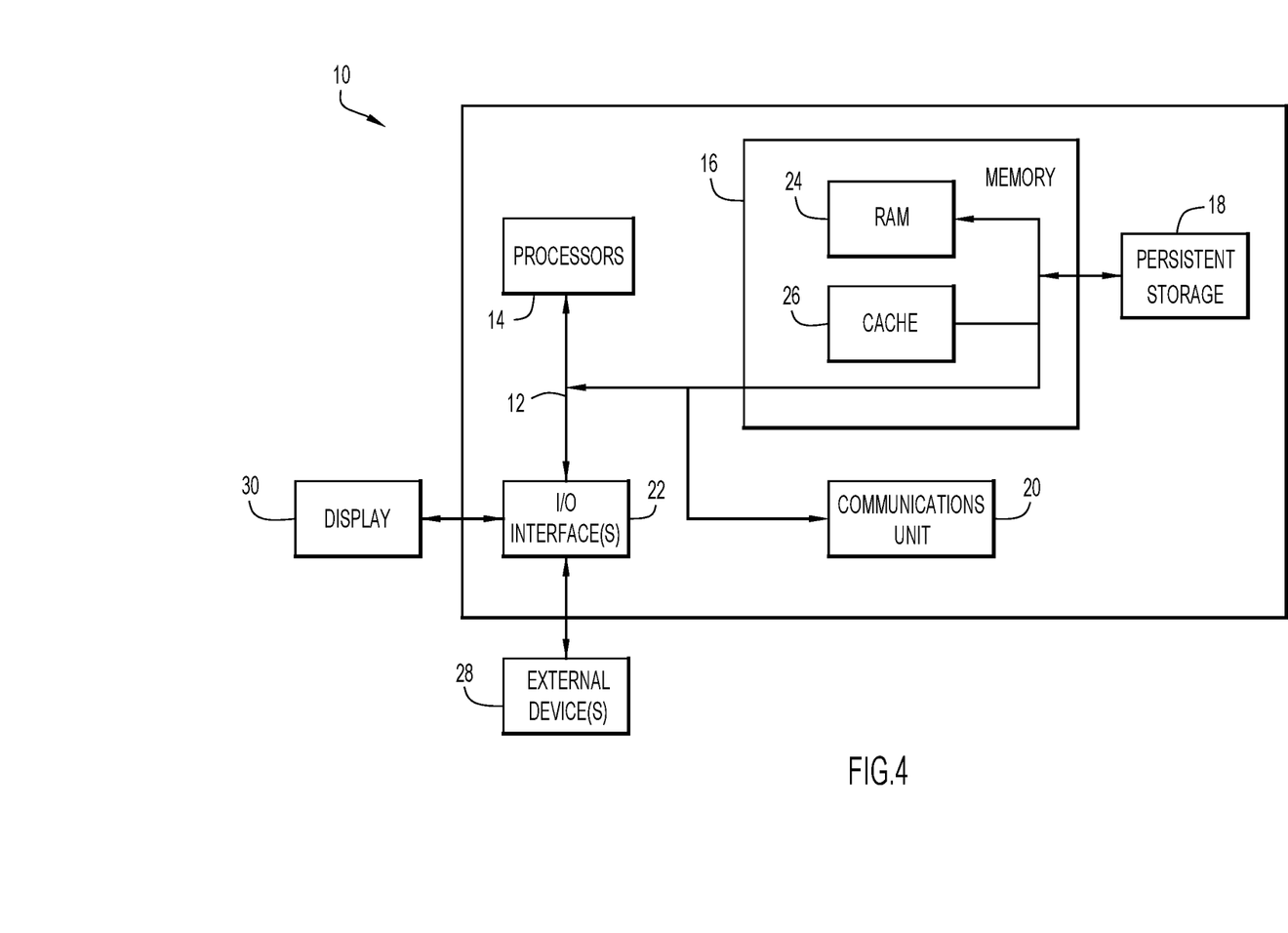
FIG. 4 is a block diagram depicting a computing device in accordance with an embodiment of the present invention.

FIG. 4 is a block diagram depicting components of a computer 10 suitable for executing the methods disclosed herein. Computer 10 may enable server 110 and nodes 150 to perform a job overlay in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to a job or a job overlay may be stored within any conventional or other data structures (e.g., files, arrays, lists, stacks, queues, records, etc.) and may be stored in any desired storage unit (e.g., database, data or other repositories, queue, etc.) The data transmitted between server 110 and nodes 150 may include any desired format and arrangement, and may include any quantity of any types of fields of any size to store the data. The definition and data model for any data relating to a job or a job overlay may indicate the overall structure in any desired fashion (e.g., computer-related languages, graphical representation, listing, etc.).

Data relating to a job or a job overlay, such as data in a computing stream, program instructions for a job, program instructions for how to perform a job overlay on a previous or current job, or metadata corresponding to a job or job overlay, may include any information provided to server 110 or node 150. Data relating to a job or a job overlay may include any desired format and arrangement, and may include any quantity of any types of fields of any size to store any desired data. The fields may indicate the presence, absence, actual values, or any other desired characteristics of the data of interest (e.g., quantity, value ranges, etc.). Data relating to a job or a job overlay may include all or any desired portion (e.g., any quantity of specific fields) of any data of interest within a given implementation or system. Data relating to a job or a job overlay may indicate the overall structure in any desired fashion (e.g., computer-related languages, graphical representation, listing, etc.).

Data that is processed in a stream computing environment may include any data, such as data that is made available over time, or an amount of data that is available immediately. A stream computing environment may perform any operation on data that it processes. A stream computing environment may include any number of nodes, processing elements, and operators, arranged in parallel and/or in series or any combination thereof. Data may flow through portions a stream computing environment in a forward (e.g., toward a data sink) direction, backward (e.g., toward a data source) direction, in a lateral direction, or any combination thereof.

The present invention embodiments may employ any number of any type of user interface (e.g., Graphical User Interface (GUI), command-line, prompt, etc.) for obtaining or providing information (e.g., data relating to a job or a job overlay), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any distributed computing system. For example, present invention embodiments may be utilized for any types of data interest (e.g, sensitive data (personal information (PI) including information pertaining to patients, customers, suppliers, citizens, and/or employees, etc.) non-sensitive data, data that may become unavailable (e.g., data that is subject to deletion after retention for a minimum time interval (e.g., information subject to various regulations, etc.), information that becomes unavailable due to system outage, power failure, or other data loss, etc.), etc.). Further, present invention embodiments may generate and utilize any quantity of data relating to a computing stream.

It will be appreciated that the embodiments described above and illustrated in the drawings represent only a few of the many ways of implementing embodiments for processing elements within a distributed computing system.

The environment of the present invention embodiments may include any number of computer or other processing systems (e.g., client or end-user systems, server systems, nodes, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., stream computing software, job overlay software, communications software, server software, overlay module 130, fusion module 135, processing element 155, operator 160, etc.). These systems may include any types of monitors and input devices (e.g., keyboard, mouse, voice recognition, etc.) to enter and/or view information.

It is to be understood that the software (e.g., stream computing software, job overlay software, communications software, server software, overlay module 130, fusion module 135, processing element 155, operator 160, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., stream computing software, job overlay software, communications software, server software, overlay module 130, fusion module 135, processing element 155, operator 160, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., stream computing data, program instructions for a job, program instructions for how to perform a job overlay on a previous or current job, or metadata corresponding to a job or job overlay). The database system may be implemented by any number of any conventional or other databases, data stores or storage structures (e.g., files, databases, data structures, data or other repositories, etc.) to store information (e.g., stream computing data, program instructions for a job, program instructions for how to perform a job overlay on a previous or current job, or metadata corresponding to a job or job overlay). The database system may be included within or coupled to the server and/or client systems. The database systems and/or storage structures may be remote from or local to the computer or other processing systems, and may store any desired data (e.g., stream computing data, program instructions for a job, program instructions for how to perform a job overlay on a previous or current job, or metadata corresponding to a job or job overlay).

The present invention embodiments may employ any number of any type of user interface (e.g., Graphical User Interface (GUI), command-line, prompt, etc.) for obtaining or providing information (e.g., data in a dataset or common data model), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of configuring processing elements within a distributed computing system comprising:
   determining a processing element within the distributed computing system affected by a software update, wherein each processing element of the distributed computing system includes a plurality of components and the software update modifies the components of the processing elements;
   splitting the determined processing element into a plurality of processing elements based on a set of factors, the set of factors including necessity of restarting components unaffected by the software update, wherein components affected by the software update are required to be restarted, and wherein splitting the determined processing element includes:
      assigning one or more components of the determined processing element unaffected by the software update to one or more of the plurality of processing elements that are not required to be restarted due to the software update.

2. The computer-implemented method of claim 1, wherein the distributed computing system includes a streaming environment, and the plurality of components include operators.

3. The computer-implemented method of claim 2, wherein the configuring occurs during run-time of the processing elements.

4. The computer-implemented method of claim 2, wherein the set of factors further includes one or more from a group of:
   a user-specified parameter indicating a manner of splitting the determined processing element;
   one or more metrics associated with the determined processing element pertaining to impact of splitting the determined processing element on other processing elements;
   impact of splitting the determined processing element on computing performance of the streaming environment;
   impact of splitting the determined processing element on low performance areas of the streaming environment; and
   one or more resource cost metrics.

5. The computer-implemented method of claim 2, wherein splitting the determined processing element further comprises:
   assigning a weight to each factor in the set of factors; and
   splitting the determined processing element based on a weighted combination of factors in the set of factors.

6. The computer-implemented method of claim 5, further comprising:

adjusting the weight of one or more factors in the set of factors based on impacts from splitting prior processing elements.

7. The computer-implemented method of claim 2, wherein the configuring occurs in response to deployment of an application within the streaming environment, and the software update includes a modification to the application.

8. The computer-implemented method of claim 1, wherein the distributed computing system includes a streaming environment, the plurality of components include operators, and the set of factors further includes a user-specified parameter indicating a manner of splitting the determined processing element.

9. The computer-implemented method of claim 1, wherein the distributed computing system includes a streaming environment, the plurality of components include operators, and the set of factors further includes one or more metrics associated with the determined processing element pertaining to impact of splitting the determined processing element on other processing elements.

10. The computer-implemented method of claim 1, wherein the distributed computing system includes a streaming environment, the plurality of components include operators, and the set of factors further includes one or more resource cost metrics.

* * * * *